United States Patent [19]

Swisher

[11] Patent Number: 4,637,569
[45] Date of Patent: Jan. 20, 1987

[54] FEATHERING RING FOR FISHING REELS

[75] Inventor: Steven L. Swisher, Tulsa, Okla.

[73] Assignee: Brunswick Corporation, Tulsa, Okla.

[21] Appl. No.: 710,608

[22] Filed: Mar. 11, 1985

[51] Int. Cl.$^4$ .............................................. A01K 89/01
[52] U.S. Cl. ............................................... 242/84.2 A
[58] Field of Search .................... 242/84.2 A, 84.21 A

[56] References Cited

U.S. PATENT DOCUMENTS 3,108,761 10/1963 Frode .
3,118,632 12/1964 Frode .
3,128,059 4/1964 Holahan, Jr. .................. 242/84.2 A
3,160,363 12/1964 Holahan .
3,259,333 7/1966 Hull ............................... 242/84.2 A
4,408,729 10/1983 Moss et al. .

FOREIGN PATENT DOCUMENTS 168921 10/1959 Sweden .

Primary Examiner—Billy S. Taylor
Attorney, Agent, or Firm—Wood, Dalton, Phillips, Mason, & Rowe

[57] ABSTRACT

A feathering and braking member is provided on the spinner head assembly associated with a spin cast reel and follows fore and aft movement of the spinner head assembly during normal operation of the reel. The feathering and braking member has a ring body and a forwardly facing, deformable ring edge which ring edge, upon encountering the inside surface of the reel cover, causes light line feathering. The ring edge is deformable so that upon the application of further forward pressure upon the spinner head assembly, the ring deforms to provide a greater contact area between the ring and the inside surface of the front cover so that feathering is increased.

6 Claims, 7 Drawing Figures

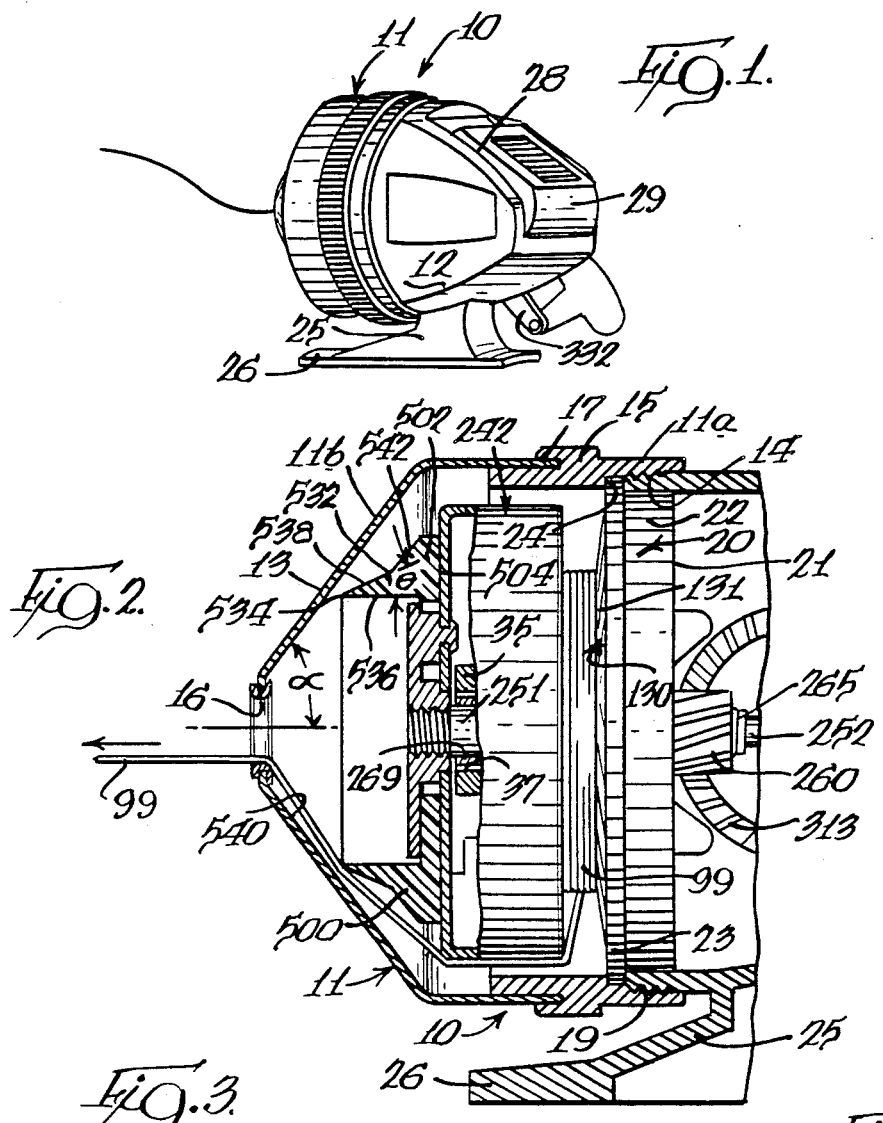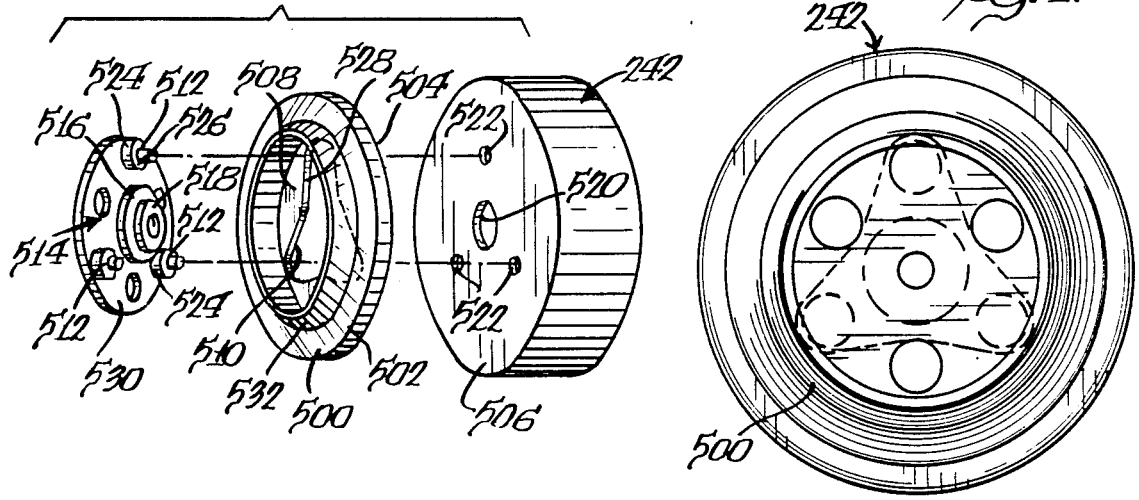

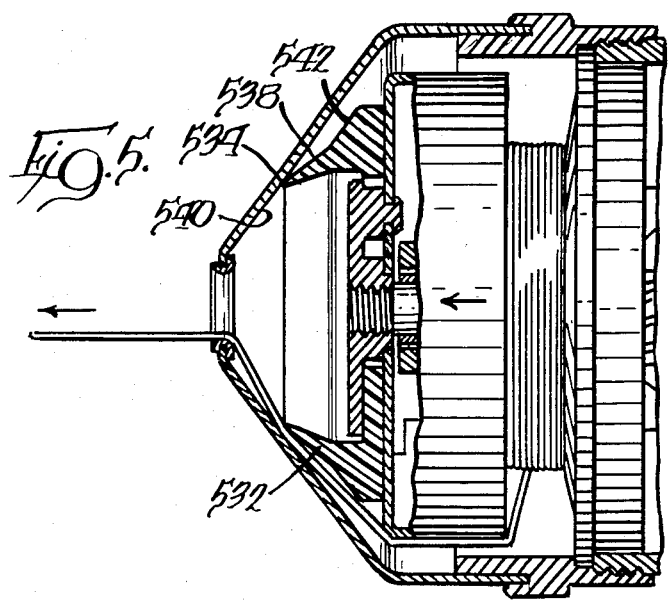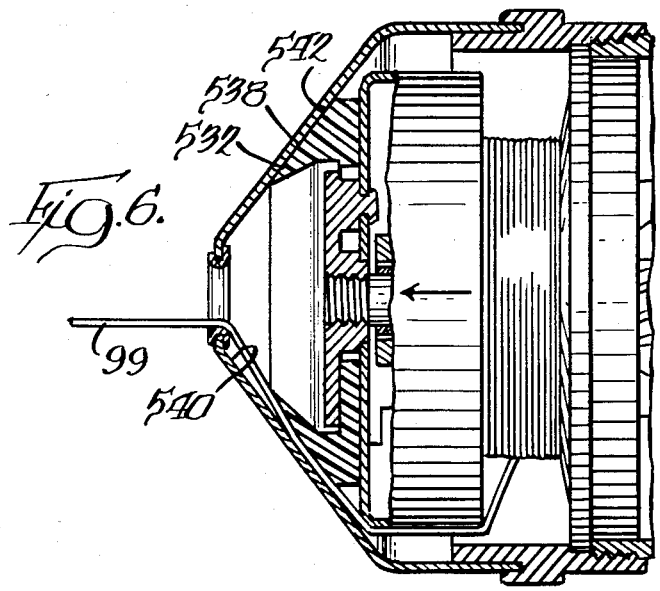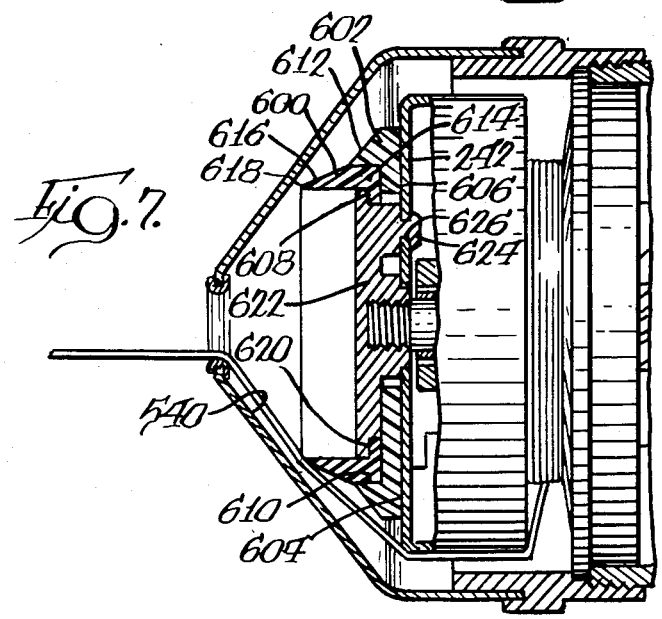

FEATHERING RING FOR FISHING REELS

BACKGROUND OF THE INVENTION

1. Field of the Invention

This invention relates to spin cast style fishing reels and, more particularly, to structure for selectively feathering line as a cast is performed.

2. Background Art

Serious fishermen strive to achieve precise placement of a cast lure. A lure can be thrust with a force greater than required to reach its intended target. A skilled fisherman can then feather the line with a thumb button as incorporated into conventional spin cast reels, to guide the lure to its intended landing area.

With conventional spin cast reels, the feathering is accomplished normally by urging a line braking surface toward an inside surface of the reel cover against which the line is snubbed at the initiation of a cast, during the backswing. The braking surface is brought into close proximity, but not against the cover surface so that the line rides over the braking surface to frictionally retard the paying out of line. As the braking surface approaches the front cover surface, the line remains in nearly continuous contact with the braking surface so that substantial feathering occurs.

While a skilled fisherman with substantial practice can develop a feel for feathering with a conventional reel, the occasional fisherman may find the feathering process frustrating. If, for example, the thumb button is depressed too far, the line will be trapped between the line braking surface and the inside surface of the front cover, abruptly halting line payout and ruining the cast.

SUMMARY OF THE INVENTION

The present invention is specifically directed to overcoming the above enumerated deficiencies known in the art in a novel and simple manner.

According to the invention a ring member is provided on the spinner head assembly associated with the reel and follows fore and aft movement of the spinner head assembly during normal operation of the reel. The ring member has a forwardly facing, deformable ring edge which, upon initially trapping the line against the inside surface of the reel cover, causes light line feathering. The ring member is sufficiently deformable so that upon the application of further forward pressure upon the spinner head assembly, additional contact area is established between the ring member and the inside surface of the front cover so that feathering is increased.

The above structure permits a desired amount of feathering to be selected through the manipulation of the thumb button without the fear of abruptly stopping line payout. The deformable nature of the ring allows line to continuously pay out even with the ring abutting the inside reel surface. A reel incorporating the invention requires a minimal number of additional parts and can be simply assembled at low cost.

BRIEF DESCRIPTION OF THE DRAWINGS

FIG. 1 is a perspective view of a spin cast reel to which the present invention can be adapted;

FIG. 2 is a fragmentary, sectional view of the forward portion of the reel in FIG. 1 with a preferred form of the present invention incorporated;

FIG. 3 is an exploded perspective view of the spinner head assembly from the reel of FIGS. 1 and 2 with the present invention incorporated;

FIG. 4 is an end elevation view of the assembled spinner head assembly;

FIG. 5 is a sectional view of the reel similar to that in FIG. 2 with the reel in a feathering mode;

FIG. 6 is a view similar to that in FIG. 5 with the reel in the line-brake mode; and FIG. 7 is a view similar to that in FIGS. 5 and 6 with an alternative form of the invention incorporated in the reel in the retrieve mode.

DETAILED DESCRIPTION OF THE DRAWINGS

Referring initially to FIGS. 1 and 2, a spin cast reel to which the present invention is particularly adaptable is disclosed. Generally, the reel has a closed face housing 10 made up of a two-part front, cup-shaped, cover 11 and a rear cup-shaped cover 12. The front cover 11 has a ring or cylindrically-shaped first part 11a and a cone-shaped second part 11b. The second part 11b has a generally annular, rearward edge portion engaging in a forwardly facing locking groove 17 associated with the first part 11a. The cone-shaped second part 11b of the cover 11 has a conical front portion 13 with a circular line opening mounting an annular line guide 16 in known manner. The cylindrical first part 11a of the front cover 11 has helical threads 14 for engagement with threads 19 externally on the forwardmost portion of the rear cover. The first part 11a has a knurled gripping portion 15 facilitating relative rotation between the covers 11, 12 for assembly and disassembly thereof. The rear cover 12 has an integrally molded, radially extending stem 25 with a mounting foot 26 on the outer end thereof for attachment in conventional manner to a fishing rod. The mounting foot 26 is attached to the upper surface of a fishing rod for use.

A reel body 20 is provided within the housing 10 and has a circular mounting plate or deck plate 21 which has a forwardly extending, cylindrical sleeve portion 22 integrally formed around the outer periphery thereof. The forward edge of the sleeve 22 has a flange 23 extending radially outwardly beyond the outer surface of the sleeve portion 22. The cylindrical first part 11a of the front cover is undercut rearward of the internal thread 14 to provide a rearwardly facing shoulder 24 axially spaced from the end of the internal thread 14. To assemble the reel, the reel body 20 with the radially extending flange 23 is inserted in the rear opening of the front cover 11 with the flange 23 bearing against the shoulder 24 and the undercut portion. The rear cover 12 is threaded into the internal thread 14 of the front cover 11 until the forwardly facing edge of the rear cover 12 engages the radially outwardly extending flange 23 to trap the reel body 20 between the front cover 11 and the rear cover 12.

A central hub 35 is carried by and projects forwardly of the deck plate 22 and is concentric with the sleeve 22. A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of a spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 and the deck plate 21. A pinion gear 260 is splined on a reduced diameter spined portion 252 of the center shaft 251 and is resiliently maintained in a forward position against the deck plate 21 by a center shaft spring 265. The splined connection between the pinion gear 260 and center shaft 251 permits axial sliding motion of the shaft 251 relative to the pinion gear 260 while at the same time rotation of the pinion gear 260 will rotate the center shaft 251. Rotation is imparted to the center shaft by a crank shaft with a face gear 313 in mesh with the pinion 260. The crank shaft is operable through an externally situated handle 332.

A more detailed description and complete understanding of the reel operation can be gained from a review of U.S. Pat. No. 4,386,743. The precise structural details of the reel, however, other than those set forth herein, are not critical to an understanding of the present invention.

According to the invention, feathering structure comprising a ring member 500, detailed in FIGS. 2-7, is incorporated into the reel. The ring member has a ring body 502 with a flat, rearwardly facing surface 504 in facial abutment with a flat, forwardly, facing surface 506 on the spinner head assembly 242. The body 502 has an integral web 508 with a three leg cut-out 510 in its mid portion. The cut-out accommodates rivets 512 projecting rearwardly from a retainer element 514. The retainer element has a stepped, central hub 516 with a reduced diameter portion 518 extensible into a mating aperture 520 on the spinner head assembly 242. With the hub 516 seated in the aperture 520, the rivets 512 align with a corresponding number of holes 522 in the spinner head assembly 242 and are deformed to effect anchoring in conventional manner. Spacing collars 524 of equal axial extent are integrally formed with the retainer and define shoulders 526 which abut the surface 506 on the spinner head assembly 242 with the retainer element in assembled relationship with the spinner head assembly. Each of the collars 524 resides in one of the legs 528 of the cut-out 510. The web 508 of the ring member 500 is held captive between the retainer element 514 and the spinner head assembly 242. The collars 524 associated with the rivets 512 determine the spacing between the rearwardly facing surface 530 of the retainer element and the forwardly facing surface 506 associated with the spinner head assembly 242. The axial dimension of the collars is chosen so that the web 508 is allowed to shift floatingly relative to the retainer element and spinner head assembly. This feature is desirable to enhance alignment of the ring member 500 during line braking.

According to the invention, the ring member 500 has a deformable, cylindrical or conical portion 532 integrally formed with and projecting forwardly of the body 502. The portion 532 has a forwardly facing, annular ring edge 534 and increases in radial thickness progressively from the edge rearwardly toward the body 502. The inside surface 536 of the ring member 500 extends substantially parallel to the axial extent of the center shaft. The outer surface 538 of the ring portion 532 is a segment of a cone making an angle $\theta$ (FIG. 2) with the axis of the center shaft that is smaller than the angle $\alpha$ between the axis of the center shaft and the inside conically shaped surface 540 of the front cover of the reel.

In normal reel operation, a thumb button 29 is pivotally mounted in a opening 28 in the reel housing. By depressing the thumb button 29, the center shaft 251 is caused to be shifted axially forwardly, carrying with it the spinner head assembly and feathering and braking ring member 500. Upon initiating a cast, the annular ring edge 534 is brought into contact with the inside surface 540 of the reel housing as shown in FIG. 5. With the thumb button fully depressed, the forward ring portion 532 is deformed to bring the outer surface 538 substantially in line with a line braking surface 542, upon the body 502, and facially against the inside cover surface 540. The line brake position is shown in FIG. 6, with the line 99 trapped firmly between the inside cover surface 540 and the outer surface 532 of the forward ring portion and/or the line braking surface 542. With the reel in the FIG. 6 position, the backswing can be carried out without paying out line. Upon thrusting the line, the thumb button is released whereupon the spinner head assembly 242 retracts sufficiently to unclamp the line so that the spinner head assembly does not interfere with the fishing line which can then be cast freely from the reel. The cast mode is depicted in FIG. 7. Once the cast is completed, the crank handle is operated to initially extend a pick-up pin (not shown) and effect rotation of the spinner head assembly which winds the line 99 upon the spool assembly.

The feathering structure of the present invention is operable with the reel in the FIG. 7 mode. Normally, the operator thrusts a lure with greater force than required to cause the lure to reach its intended target. Before the lure hits the water, the line is feathered which retards the rate of payout. Feathering is accomplished with the invention by applying pressure to the thumb button to bring the forward ring edge 534 against the inside surface 540 of the housing as in FIG. 5. Because the front ring portion 532 is deformable, the line will still continue to pay out. The operator will be able to detect, by feel, that the edge 534 has encountered the reel housing. If additional feathering is desired, the center shaft is urged forwardly by depressing with a greater pressure upon the thumb button which brings additional surface area of the ring portion 532 into contact with the inside surface 540 of the reel housing. Still further pressure causes the ring to assume the FIG. 6 position, wherein the line is snubbed. Accordingly, the operator can choose light feathering as occurs with the reel in the FIG. 5 mode, and progressively increase feathering until the line snubbed position is achieved in FIG. 6.

It may be desirable to have the feathering ring more readily deformable than the element defining the line brake surface. Accordingly, a two part construction is contemplated according to the invention as depicted in FIG. 7. The line feathering ring 600 is provided and mated with a separate line brake ring 602 carried on the forward face 604 of the spinner head assembly 242. The brake ring 602 has a flat rearwardly facing surface 606 which facially abuts the face 604 of the spinner head assembly. The ring 602 is undercut at its forward region to define a forwardly facing annular shoulder 608 and a radially inwardly facing annular surface 610. The brake ring 602 is preferably made from a hard plastic material and has a brake surface 612 which remains substantially parallel with the inside conically shaped cover surface 540 throughout the fore and aft operating range of the spinner head assembly.

The brake ring 602 comprises a cylindrical body 614 and an integral, tapering front projection 616 with an annular, forwardly facing leading edge 618. The body 614 fits closely within the seat defined cooperatively by the shoulder 608 and surface 610.

The feathering ring 600 itself is undercut to provide an annular, forwardly facing shoulder 620. To maintain the feathering ring 600 against the braking ring 602 and in turn the braking ring against the spinner head assembly 242, a retainer element 622 is provided. The retainer element 622 has integral rivets 624 directed through apertures 626 in the spinner head assembly. The rivets are deformed to effect anchoring with the spinner head assembly.

With the two part construction in FIG. 7, different materials can be used to form the line feathering and line braking rings. Use of a soft, deformable material for the feathering ring enhances feathering, while allowing the line braking ring to be formed of harder plastic that is characteristic of a large number of conventional reels. The structure in FIG. 7 operates otherwise in the same manner as the structure previously described in FIGS. 1-6.

It should be understood that the foregoing detailed description was made for purposes of demonstrating the structure and operation of the present invention, with no unnecessary limitations to be understood therefrom.

I claim:

1. In a fishing reel of the type having a front cover with a conically-shaped portion with an inside surface tapering forwardly to a line guide, a reel body having a deck plate, a center shaft extending through the reel in an axial direction, a spinner head assembly carried by the center shaft, crank drive means for rotating the center shaft and spinner head assembly to retrieve fishing line and means for selectively moving the center shaft and spinner head axially forwardly and rearwardly relative to the deck plate, line feathering structure comprising:
   a deformable ring formed from a first material and having a forwardly facing edge and an annular, radially facing surface rearwardly of the edge;
   means attaching the ring to the spinner head assembly to follow the axially forward and rearward movement of the center shaft and spinner head assembly;
   said annular, radially facing surface situated in nonparallel relationship with the inside surface of the front cover with the feathering structure disengaged;
   a line braking member formed from a second material and separate from the ring and having a surface engageable with the inside surface of the front cover to trap the line against the inside surface of the front cover; and
   means attaching the line braking member to the spinner head assembly to follow the axially forward and rearward movement of the center shaft and spinner head assembly;
   said annular, radially facing surface deforming and residing together with the surface of the line braking member against the inside surface of the front cover with the line braked at the initiation of a cast,
   said first material being more deformable than the second material so that smooth progressive feathering of the line can occur as the ring is pressured against the inside surface of the front cover.

2. The feathering structure according to claim 1, wherein the radial thickness of the ring increases progressively rearwardly from the forwardly facing edge and the means attaching the line braking member and ring to the spinner head assembly floatingly attach the line brake member and ring so that the line braking member and ring self center with respect to the front cover.

3. The feathering structure according to claim 1 wherein said annular, radially facing surface is substantially flat and facially abuts the inside surface of the front cover simultaneously as the line braking surface encounters the inside surface of the front cover.

4. The feathering structure of claim 1 wherein the line braking member has an annular undercut defining a forwardly facing shoulder and the deformable ring is press fit with the line braking member in abutting relationship with the shoulder.

5. The feathering structure according to claim 4 wherein a retainer element attaches to the spinner head assembly and bears the deformable ring against the shoulder.

6. In a fishing reel of the type having a front cover with a line guide and an inside surface, a reel body having a deck plate, a center shaft extending through the deck plate in an axial direction, a spinner head assembly carried by the center shaft, crank drive means for rotating the center shaft and spinner head assembly to retrieve fishing line and means for selectively moving the center shaft and spinner head axially forwardly and rearwardly relative to the deck plate, line feathering structure comprising:
   a ring having a deformable, forwardly projection portion;
   means attaching the ring to the spinner head assembly so that the ring follows the axially forward and rearward movement of the center shaft and spinner head assembly;
   a line braking member separate from the ring and having a surface engageable with the inside surface of the front cover to trap the line against the inside surface of the front cover; and
   means attaching the line braking member to the spinner head assembly so that the line braking member follows the axially forward and rearward movement of the center shaft and spinner head assembly,
   whereby the forwardly projecting portion of the ring can be brought into contact with the inside surface of the front cover to feather the line before the surface of the line braking member traps the line against the inside surface of the front cover and the ring can be selectively pressured against the inside surface of the front cover to progressively deform the ring as forward pressure is applied to the ring and thereby increase the area of contact between the ring and the inside surface of the front cover to increase feathering,
   wherein the line braking member is separate from the ring and made from a first material and the ring is made from a second material that is different from the first material and more deformable than the first material.

* * * * *